(No Model.)

W. WARD.
DRAFTING SQUARE.

No. 368,797. Patented Aug. 23, 1887.

Witnesses
Joseph Lyman
Homer H. Field

Inventor
William Ward

N. PETERS, Photo-Lithographer, Washington, D. C.

UNITED STATES PATENT OFFICE.

WILLIAM WARD, OF COUNCIL BLUFFS, IOWA.

DRAFTING-SQUARE.

SPECIFICATION forming part of Letters Patent No. 368,797, dated August 23, 1887.

Application filed November 26, 1886. Serial No. 219,939. (No model.)

*To all whom it may concern:*

Be it known that I, WILLIAM WARD, a citizen of the United States, residing at Council Bluffs, in the county of Pottawattamie and State of Iowa, have invented a new and useful Drawing-Board and Square, of which the following is a specification.

My invention relates to improvements in drawing-boards and squares to which adjustable scales of linear measurement are attached, first, for the purpose of locating points upon drawings; second, for locating points while copying drawings; third, for locating points when reducing or enlarging drawings. I attain these objects by the mechanism illustrated in the accompanying drawings, in which—

Figure 1:
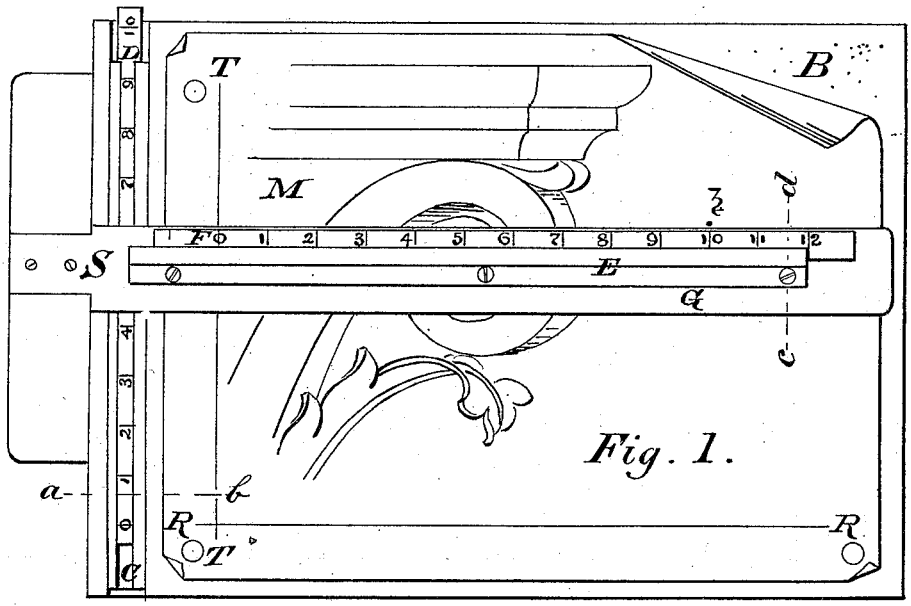
Figure 2:
Figure 3:
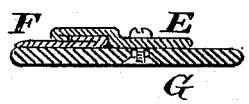
Figure 4:
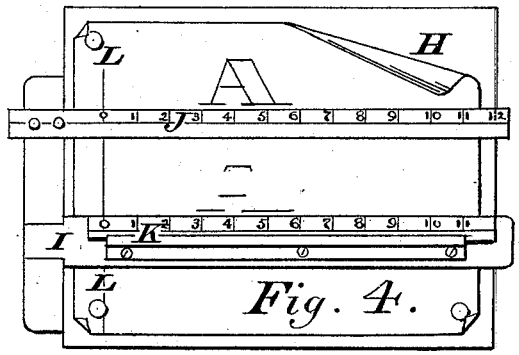
Figure 5:
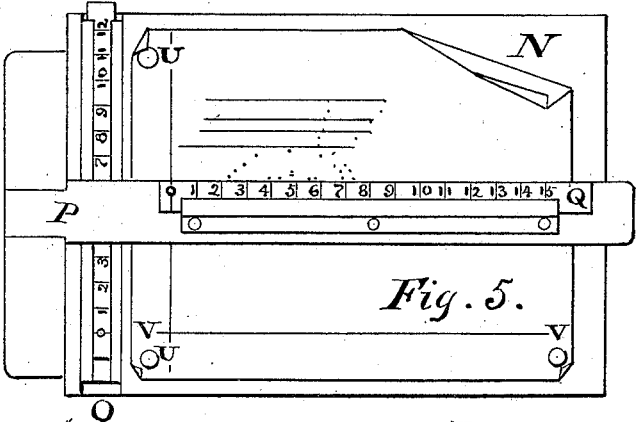

Figure 1 is a view of the drawing-board with paper, square, and scales; Fig. 2, an enlarged section perpendicular to the surface of the board through the line *a b* on Fig. 1; Fig. 3, an enlarged section through the blade of the square on the line *c d*, Fig. 1; Fig. 4, a view of a drawing-board and square with scales for copying; Fig. 5, a view of the drawing-board and square with scales for reducing a drawing, as M, Fig. 1.

Similar letters refer to similar parts in Figs. 1, 2, and 3.

The channel-bar C is let into the drawing-board B flush with its surface and fastened. The channel-bar C and the scale D correspond in section, so that the scale D can be readily adjusted by sliding it endwise. The channel-bar E is secured to the blade G of the square S, forming, with G, a groove in which the scale F will slide easily.

I attain the first object by drawing lines of reference, as R R and T T, Fig. 1, perpendicular to each other and parallel with the scales D and F. Adjust the 0's of the scales to these lines of reference and find a point, as Z, situate in this instance six units of the scale from R R and ten from T T, by placing the upper edge of the square-blade at 6 on the scale D and marking the point at 10 at the edge of the scale F.

The manner of finding a point now in use is by marking its distance from one line of reference with dividers or a scale, drawing an auxiliary line through the mark, and finding the position of the point upon this auxiliary line by a separate measurement of its distance from the other line of reference.

I attain the second object by two scales set parallel with each other, as illustrated in Fig. 4, to be moved perpendicular to their length. H in this figure is the surface of a drawing-board; I, a square, the blade of which carries the scale K. J is an additional scale, secured to the stock of the square I parallel to the scale K. I copy a drawing, as A, Fig. 4, by placing the upper edge of the scale J against a line parallel with the scale, observing the distance of its ends from the line of reference L L, and drawing a line between corresponding points against the lower scale, K, while the combination is in the same position. Single points at the end of oblique lines or in curves are found by adjusting the edge of the scale J to them, noting their distance from the line of reference L L, and marking them against corresponding figures at the edge of the lower scale, K, in a similar manner.

The method of copying a drawing now in use is to draw auxiliary lines through points in the original, extending far enough to pass through the copy. Then locate the points upon these auxiliary lines by separate measurements.

I attain the third object by making the copy with scales of a different denomination to those placed upon the original. Let M, Fig. 1, be the original drawing to be copied, and N, Fig. 5, a drawing-board upon which (in this instance) a copy half lineal size is to be made; O, a scale upon the board N; P, a square with a scale, Q, upon it, all corresponding to similar parts on Fig. 1, except as to size. I adjust the scales O and Q, Fig. 5, to the lines of reference U U and V V, place the square S, Fig. 1, against a line, and observe the figure indicating its height upon the scale D. I then place the square P against the corresponding figure upon the scale O, Fig. 5. Next observe the position of the points to be transferred from Fig. 1 and mark them against corresponding figures upon the scale Q, Fig. 5.

The present manner of reducing or enlarging drawings is by making separate measurements for each point with a scale or dividers.

This mechanism does not come into competition with the pantograph, because the pantograph cannot be used conveniently upon drawings composed of straight lines and geometrical curves, and not at all where points are to be marked down from measurements of an object.

I do not claim the use of adjustable scales upon drawing-boards, knowing that they have been patented already.

What I claim as my invention, and desire to secure by Letters Patent, is—

An adjustable scale, in combination with a drafting-square blade adapted to slide in a groove in a fixed channel-bar for the purpose of locating points upon drawings, substantially as described.

WILLIAM WARD.

Witnesses:
JOSEPH LYMAN,
HOMER H. FIELD.